C. CAMPBELL.
Hen's Nest.
No. 52,675. Patented Feb. 20, 1866.
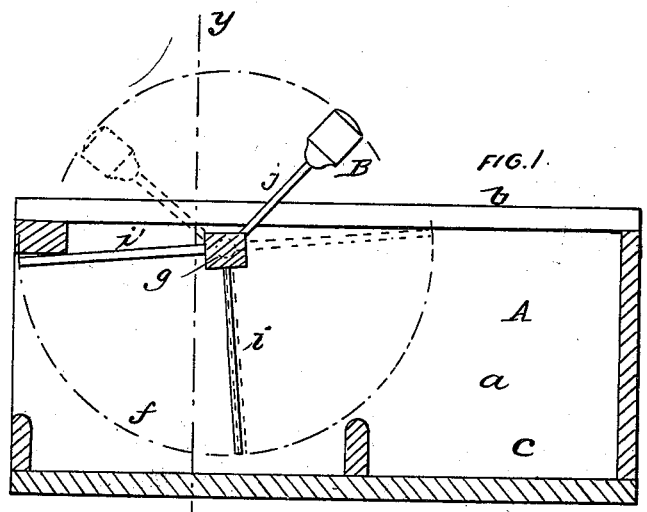
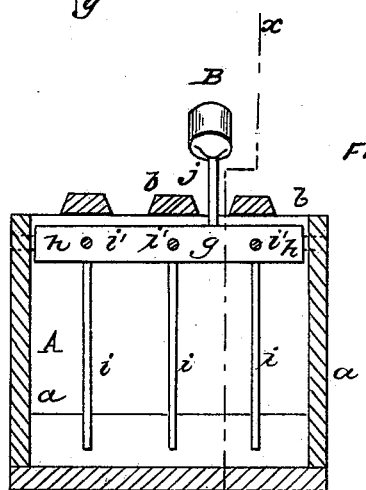

UNITED STATES PATENT OFFICE.

CHARLES CAMPBELL, OF YELLOW HEAD, ILLINOIS.

IMPROVEMENT IN HENS' NESTS.

Specification forming part of Letters Patent No. 52,675, dated February 20, 1866.

*To all whom it may concern:*

Be it known that I, CHARLES CAMPBELL, of Yellow Head, in the county of Kankakee and State of Illinois, have invented a new and Improved Hen's Nest; and I do hereby declare that the following is a full, clear, and exact description thereof, which will enable those skilled in the art to make and use the same, reference being had to the accompanying drawings, forming part of this specification, in which—

Figure 1 is a longitudinal vertical section of my invention, taken in the line $x\ x$, Fig. 2; Fig. 2, a transverse vertical section of the same, taken in the line $y\ y$, Fig. 1.

Similar letters of reference indicate corresponding parts.

This invention consists in providing a hen's nest with a pivoted or suspended door, counterpoised and arranged in such a manner that but one hen can enter and sit upon the nest at once.

The object of the invention is to prevent hens laying eggs in the nests of setting hens, and also to prevent one hen from driving another off from the nest.

A represents a box of rectangular form, and which may have close or solid sides $a\ a$ and a top composed of slats $b$. This box is designed to be of such dimensions that the rear part, $c$, will be sufficient for a hen's nest, the other part, $f$, being for the door to operate in. This door is composed of a bar, $g$, placed transversely in the upper part of the box A and working freely on journals $h$, and having two sets of wires or rods, $i\ i'$, attached to it at right angles with each other, as shown clearly in Fig. 1. The bar $g$ has a rod, $j$, attached to it, forming an angle of one hundred and thirty-five degrees with the wires $i\ i'$, and this rod $j$ has a weight or counterpoise, B, on its end. The wires or rods $i\ i'$ serve as doors for the nest $c$, the rods $i$ serving as a door when the nest is vacant, and $i'$ serving in such capacity when the nest is occupied.

When a hen enters the box A the wires $i$ are shoved back and the rods $i'$ move downward behind her, the weight B assisting the turning of the bar $g$, and the outer ends of the rods $i$ striking the slats $b$, which serve as stops for $i$, as indicated in red in Fig. 1.

The rods $i'$, it will be seen, prevent a second hen from entering the nest, but the hen on the nest may readily pass out at any time, as the rods $i'$, when slightly pushed against, will yield and move outward and upward, the rods $i$ moving down as the hen passes out, and assuming the position shown in black when the hen is out of the box. The weight or counterpoise prevents the casual movement of the wires or rods.

Having thus described my invention, I claim as new and desire to secure by Letters Patent—

The wires or rods $i\ i'$, or their equivalents, attached to the pivoted bar $g$, provided with a weight or counterpoise, B, and fitted in the box A, and all arranged to operate substantially in the manner as and for the purpose herein set forth.

CHARLES CAMPBELL.

Witnesses:
JAY CAMPBELL,
JAMES SHERIDAN.